United States Patent
Shimazu et al.

(10) Patent No.: US 9,163,864 B2
(45) Date of Patent: Oct. 20, 2015

(54) AIR-CONDITIONING APPARATUS WITH OIL RETURN IN A TRANSCRITICAL CYCLE

(75) Inventors: Yusuke Shimazu, Tokyo (JP); Keisuke Takayama, Tokyo (JP); Takeshi Hatomura, Tokyo (JP)

(73) Assignee: MITSUBISHI ELECTRIC CORPORATION, Chiyoda-Ku, Tokyo (JP)

(*) Notice: Subject to any disclaimer, the term of this patent is extended or adjusted under 35 U.S.C. 154(b) by 397 days.

(21) Appl. No.: 13/635,152

(22) PCT Filed: Mar. 29, 2010

(86) PCT No.: PCT/JP2010/002269
§ 371 (c)(1),
(2), (4) Date: Sep. 14, 2012

(87) PCT Pub. No.: WO2011/121634
PCT Pub. Date: Oct. 6, 2011

(65) Prior Publication Data
US 2013/0000339 A1 Jan. 3, 2013

(51) Int. Cl.
*F25B 9/00* (2006.01)
*F25B 31/00* (2006.01)

(52) U.S. Cl.
CPC .............. *F25B 31/004* (2013.01); *F25B 9/008* (2013.01); *F25B 2309/061* (2013.01); *F25B 2500/16* (2013.01); *F25B 2600/0253* (2013.01); *F25B 2600/2513* (2013.01); *F25B 2600/2519* (2013.01); *Y02B 30/741* (2013.01)

(58) Field of Classification Search
CPC ... F25B 31/004; F25B 31/002; F25B 2500/16

USPC ....................... 62/84, 192, 468, 470
See application file for complete search history.

(56) References Cited

U.S. PATENT DOCUMENTS 5,673,570 A * 10/1997 Sada ............................... 62/468
2010/0064700 A1* 3/2010 Ziehr et al. ........................ 62/84

FOREIGN PATENT DOCUMENTS

JP 2003-106690 A 4/2003
JP 2004-101143 A 4/2004
(Continued)

OTHER PUBLICATIONS

JP 2008-190790 (English Translation).*
(Continued)

*Primary Examiner* — Jonathan Bradford
(74) *Attorney, Agent, or Firm* — Buchanan Ingersoll & Rooney PC

(57) ABSTRACT

In an air-conditioning apparatus that uses a refrigerant, which operates in a transcritical cycle, and refrigerating machine oil, which has low miscibility with the refrigerant, in a refrigerant circuit for a refrigeration cycle connected to a compressor, a radiator, an expansion mechanism, and an evaporator, the air-conditioning apparatus includes a flow regulating mechanism provided in the refrigerant circuit, and controller that controls the flow regulating mechanism. If a refrigerant flow velocity at an outlet side of the radiator is lower than a predetermined threshold value, the refrigerant flow velocity at the outlet side of the radiator is increased by the controller so that oil-return operation that returns the refrigerating machine oil discharged from the compressor to the compressor is performed for at least a predetermined time period.

10 Claims, 8 Drawing Sheets

(56) References Cited

FOREIGN PATENT DOCUMENTS

| | | |
|---|---|---|
| JP | 2008-107060 A | 5/2008 |
| JP | 2008-190790 A | 8/2008 |
| JP | 2008-209105 A | 9/2008 |
| WO | WO 2009/040889 A1 | 4/2009 |

OTHER PUBLICATIONS

JP 2007-068606 (English Translation).*

Office Action (Notification of the First Office Action) issued on Apr. 22, 2014, by the Chinese Patent Office in corresponding Chinese Patent Application No. 201080065842.5, and an English Translation of the Office Action . (15 pages).

Office Action (Notice of Reasons for Rejection) issued on May 7, 2014, by the Japan Patent Office in corresponding Japanese Patent Application No. 2012-507886, and an English Translation of the Office Action. (6 pages).

International Search Report (PCT/ISA/210) issued on Jun. 29, 2010, by the Japanese Patent Office as the International Searching Authority for International Application No. PCT/JP2010/002269.

Extended European Search Report issued on Nov. 14, 2013, by the European Patent Office in corresponding European Patent Application No. 10848817.2-1602. (6 pages).

Japanese Office Action (Notice of Reasons for Refusal) dated Sep. 24, 2013, issued by the Japanese Patent Office in corresponding Japanese Application No. 2012-507886, and an English Translation thereof.

* cited by examiner

AIR-CONDITIONING APPARATUS WITH OIL RETURN IN A TRANSCRITICAL CYCLE

TECHNICAL FIELD

The present invention relates to an oil-return process performed when refrigerating machine oil discharged from a compressor accumulates in a radiator in an air-conditioning apparatus in which a cycle becomes a transcritical cycle.

BACKGROUND ART

In an air-conditioning apparatus of the related art that uses a fluorocarbon refrigerant, refrigerating machine oil that is readily soluble in a liquid refrigerant having miscibility therewith is used. This is particularly typical when used for the purpose of air conditioning a building, in which the refrigeration cycle is large-scaled and complicated, because it is advantageous in that the refrigerating machine oil is less likely to accumulate in areas where the liquid refrigerant exists within the cycle.

However, with a recent trend towards the use of natural refrigerants, such as carbon dioxide, mechanical components, such as a compressor, require refrigerating machine oil with high viscosity. High-viscosity refrigerating machine oil has low solubility in the refrigerant and thus tends to accumulate in the refrigeration cycle. If the refrigerating machine oil accumulates in a heat exchanger, the heat transfer performance would be reduced, and if the refrigerating machine oil accumulates in the heat exchanger, a piping, or a container, the amount of oil inside the compressor would be reduced. This would hinder reliability.

As a measure of the above, there has been proposed an apparatus in which an oil-return operation is performed when the compressor is operating at a low frequency by making an indoor heat exchanger function as a radiator and by increasing the frequency of the compressor (for example, see Patent Literature 1).

CITATION LIST

Patent Literature

Patent Literature 1: Japanese Unexamined Patent Application Publication No. 2008-107060 (pages 11-12, FIG. 3)

SUMMARY OF INVENTION

Technical Problem

However, the air-conditioning apparatus of the related art is targeted to the accumulation of the refrigerating machine oil in the indoor heat exchanger and does not target the accumulation of the refrigerating machine oil in an outdoor heat exchanger. Moreover, there is a problem in that partial load, such as when one or some of the indoor heat exchangers are suspended among a plurality of indoor heat exchangers, is not taken into account.

Furthermore, since the cycle becomes a transcritical cycle, an oil-return technology mainly directed to an area where the refrigerant is in a superheated gas state in a liquid-refrigerant/refrigeration-oil system or a two-phase-refrigerant/refrigerating machine oil system employing a fluorocarbon refrigerant cannot be applied, and there are no discussions with regard to an oil-return technology in a radiator, a high-pressure piping, and a high-pressure container in a supercritical-refrigerant/refrigeration-oil system.

The invention has been made to solve the aforementioned problems and provides an air-conditioning apparatus with increased reliability by enabling return of refrigerating machine oil accumulating in the supercritical side of a transcritical cycle to a compressor.

Solution to Problem

In an air-conditioning apparatus according to the invention that uses a refrigerant, which operates in a transcritical cycle, and refrigerating machine oil, which has low miscibility with the refrigerant, in a refrigerant circuit for a refrigeration cycle connected to a compressor, a radiator, an expansion mechanism, and an evaporator, the air-conditioning apparatus includes a flow regulating mechanism provided in the refrigerant circuit, and flow control means that controls the flow regulating mechanism. If a refrigerant flow velocity, in which the refrigerant is in a supercritical state, at an outlet side of the radiator is lower than a predetermined threshold value, the refrigerant flow velocity at the outlet side of the radiator is increased by the flow control means so that oil-return operation that returns the refrigerating machine oil discharged from the compressor to the compressor is performed for at least a predetermined time period.

Advantageous Effects of Invention

In the air-conditioning apparatus according to the invention, if the refrigerant flow velocity at the outlet side of the radiator is lower than the predetermined threshold value, the refrigerant flow velocity at the outlet side of the radiator is increased by the flow control means so that the oil-return operation for returning the refrigerating machine oil discharged from the compressor to the compressor is performed for at least a predetermined time period. Therefore, the refrigerating machine oil discharged from the compressor is appropriately returned to the compressor, thereby increasing the reliability of the air-conditioning apparatus.

DESCRIPTION OF EMBODIMENTS

Embodiment 1

Figure 1:
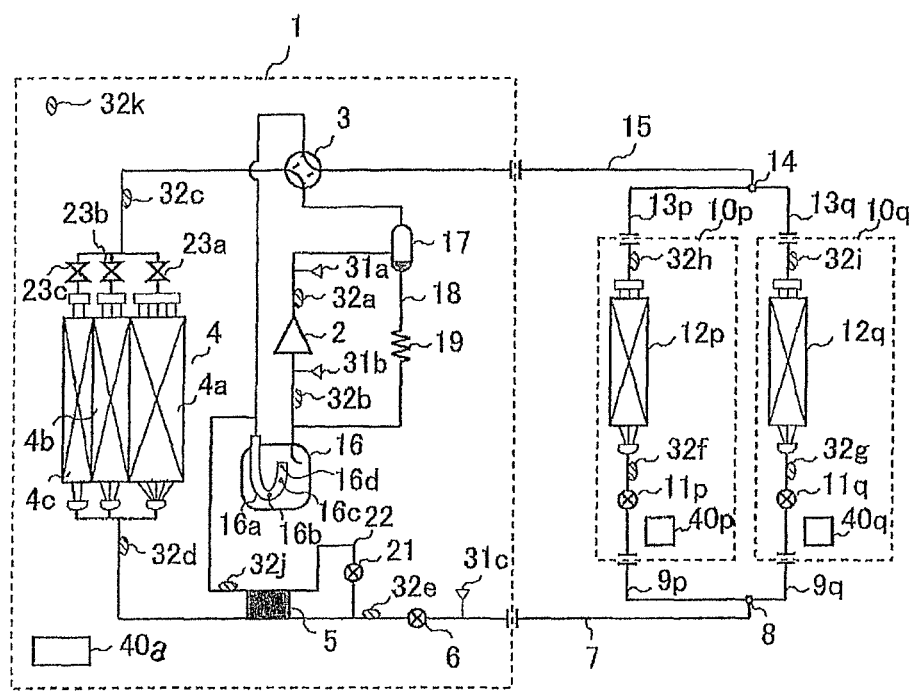
FIG. 1 is a block diagram illustrating an air-conditioning apparatus according Embodiment 1 of the invention.

FIG. 1 shows a refrigerant circuit diagram of an air-conditioning apparatus according to Embodiment 1 of the invention. Embodiment 1 of the invention will be described below.

In FIG. 1, reference numeral 1 denotes an outdoor unit, 10*p* and 10*q* denote indoor units, 15 denotes a main gas piping connected to the outdoor unit 1, 13p and 13q denote gas branch pipings connected to the indoor units 10p and 10q, 14 denotes a junction point between the main gas piping 15 and the gas branch pipings 13p and 13q, 7 denotes a main liquid piping connected to the outdoor unit 1, 9p and 9q denote liquid branch pipings connected to the indoor units 10p and 10q, and 8 denotes a junction point between the main liquid piping 7 and the liquid branch pipings 9p and 9q.

In the outdoor unit 1, an oil separator 17 and a four-way valve 3 for switching flow paths are provided on the discharge side of a compressor 2. Reference numerals 4a, 4b, and 4c denote heat-exchanger paths having different heat transfer areas that, as a whole, constitute an outdoor heat exchanger 4. Reference numerals 5 and 6 respectively denote a supercooling heat exchanger and an outdoor expansion mechanism, which are sequentially connected to the main liquid piping 7. The suction side of the compressor 2 is connected to an accumulator 16, the four-way valve 3, and the main gas piping 15 in this order. Reference numeral 18 denotes an oil return bypass whose one end is connected to a lower inner portion of the oil separator 17 and the other end is connected to a piping on the suction side of the compressor 2.

Reference numeral 22 denotes a supercooling bypass that branches off from between the supercooling heat exchanger 5 and the main liquid piping 7 and that merges with a piping that connects the accumulator 16 and the four-way valve 3. The supercooling bypass 22 is connected to a supercooling regulating valve 21 and the supercooling heat exchanger 5. Reference numeral 16a denotes a U-tube provided in the accumulator 16 connected to the suction side of the compressor 2, and 16b, 16c, and 16d denote oil return holes in the accumulator 16. Furthermore, reference numeral 40a denotes a controller of the outdoor unit 1.

In the indoor units 10p and 10q, reference numerals 11p and 11q are indoor expansion mechanisms and 12p and 12q are indoor heat exchangers that are respectively connected, in this order, to the gas branch pipings 9p and 9q, connected to the indoor units 10p and 10q, and then to the liquid branch pipings 13p and 13q. Furthermore, reference numerals 40p and 40q denote controllers of the indoor units 10p and 10q, respectively.

The compressor 2 has an inverter circuit and is of a capacity-controllable type in which the inverter circuit converts the power supply frequency so as to control the rotation speed. The outdoor expansion mechanism 6, the supercooling regulating valve 21, and the indoor expansion mechanisms 11p and 11q are, for example, electronic expansion valves whose opening degrees are variably controllable. In this example, the controller 40a controls the outdoor expansion mechanism 6 and the supercooling regulating valve 21, and the controllers 40p and 40q respectively control the indoor expansion mechanisms 11p and 11q.

As regards pressure sensors in the outdoor unit 1, reference numeral 31a denotes a pressure sensor provided on the discharge side of the compressor 2, 31b is a pressure sensor provided on the suction side of the compressor 2, and 31c is a pressure sensor provided between the outdoor expansion mechanism 6 and the indoor expansion mechanisms 11p and 11q. These pressure sensors measure the pressures at each of the respective locations.

As regards temperature sensors in the outdoor unit 1, reference numeral 32a denotes a temperature sensor provided between the compressor 2 and the oil separator 17; 32b is a temperature sensor provided between the compressor 2 and the accumulator 16; 32c is a temperature sensor provided between the outdoor heat exchanger 4 and the four-way valve 3; 32d is a temperature sensor provided between the outdoor heat exchanger 4 and the supercooling heat exchanger 5; 32e is a temperature sensor provided between the supercooling heat exchanger 5, the outdoor expansion mechanism 6, and the supercooling regulating valve 21; and 32j is a temperature sensor provided between the supercooling heat exchanger 5, the accumulator 16, and the four-way valve 3. These temperature sensors measure the temperatures at their respective locations. Furthermore, a temperature sensor 32k measures the ambient temperature of the outdoor unit 1.

Among the sensors in the indoor units 10p and 10q, reference numerals 32f and 32g denote temperature sensors respectively provided between the indoor heat exchangers 12p and 12q and the indoor expansion mechanisms 11p and 11q, and 32h and 32i are temperature sensors respectively provided between the indoor heat exchangers 12p and 12q and the gas branch pipings 13p and 13q. These temperature sensors measure the temperatures at their respective locations.

As described above, the outdoor unit 1 and the indoor units 10p and 10q are respectively provided with the controllers 40a, 40p, and 40q constituted by, for example, microcomputers. Based on measurement information obtained by the pressure sensors 31 and the temperature sensors 32 and operation details (load request) commanded by a user using the air-conditioning apparatus, these controllers control, for example, the operating frequency of the compressor 2, the flow-path switching operation of the four-way valve 3, the heat exchange amount of the outdoor heat exchanger 4, the opening degree of the outdoor expansion mechanism 6, the opening degree of the supercooling regulating valve 21, and the opening degrees of the indoor expansion mechanisms 11p and 11q. Furthermore, these controllers can transmit and receive communication including various kinds of data, for example.

In the following description, the term "controller 40" will be used when collectively referring to all of the controllers 40a, 40p, and 40q. Although the controller 40a is disposed in the outdoor unit 1 and the controllers 40p and 40q are disposed in the indoor units 10p and 10q separately from each other, the controllers may be disposed together in a single place. Moreover, a single device may control each of the devices. An internal configuration for executing the function of the controller 40 will be described later.

The refrigerant is one that operates in a transcritical cycle and is, for example, carbon dioxide, which is a natural refrigerant.

Fluorocarbon refrigerants of the related art are not used in a supercritical state in a refrigeration cycle, but are used only in a gas-phase, liquid phase, or two-phase gas-liquid state. As control targets and operational states in a refrigeration cycle, "saturation temperature", "degree of supercooling", and "degree of superheat" are widely used.

In contrast, carbon dioxide can turn into the supercritical state in addition to the states such as gas-phase, liquid phase, and two-phase gas-liquid states. The terms such as the main "gas" piping and the "supercooling" heat exchanger do not indicate the state of the refrigerant, and naturally include the supercritical state. The concept "saturation temperature", "degree of supercooling", and "degree of superheat" widely used in the fluorocarbon refrigerant of the related art will also be applied to the supercritical state with a similar interpretation.

Although the concept "supercooling" is not included when the pressure is higher than or equal to the critical pressure, ("pseudo" degree of supercooling)=("pseudo" saturation temperature)−(temperature) can be defined by defining the "pseudo" saturation temperature at a pressure value higher than or equal to the critical pressure as ("pseudo" saturation temperature)=(temperature corresponding to the pressure value and the critical enthalpy). In the following description, the "pseudo" degree of supercooling and the "pseudo" saturation temperature will be treated the same as the degree of supercooling and the saturation temperature, respectively, when the pressure is lower than or equal to the critical pressure. Alternatively, the following definition is also permissible: ("pseudo" saturation temperature)=(temperature when isopiestic specific heat at pressure value becomes maximum value) and ("pseudo" degree of supercooling)=("pseudo" saturation temperature)−(temperature). Accordingly, a control technique similar to that for a vapor compression cycle using the fluorocarbon refrigerant of the related art can be employed so that the design load can be reduced, thereby ensuring reliability.

Next, the operation of the air-conditioning apparatus will be described. First, description will be given on the operation during the cooling operation. The four-way valve 3 is connected in directions indicated by solid lines in FIG. 1. The outdoor expansion mechanism 6 is set in a fully open state or a nearly fully open state. The supercooling regulating valve 21 and the indoor expansion mechanisms 11p and 11q are set to appropriate opening degrees. The flow of the refrigerant in this case is as follows.

As high-pressure high-temperature gas refrigerant discharged from the compressor 2 travels through the oil separator 17, a major portion of refrigerating machine oil mixed in the refrigerant is separated therefrom and is accumulated at the inner bottom section of the oil separator. The refrigerating machine oil then travels through the oil return bypass 18 so as to reach the suction side of the compressor 2. Thus, the amount of refrigerating machine oil existing between the oil separator 17 and the accumulator 16 can be reduced, thereby advantageously increasing the reliability of the compressor.

On the other hand, the high-pressure high-temperature refrigerant with the reduced percentage of refrigerating machine oil therein travels through the four-way valve 3 and rejects heat at the outdoor heat exchanger 4 so as to become a high-pressure low-temperature refrigerant, which then enters the supercooling heat exchanger 5. A branching flow exiting the supercooling heat exchanger 5 undergoes appropriate flow control at the supercooling regulating valve 21 so as to become a low-pressure refrigerant, which then exchanges heat with the refrigerant exiting the outdoor heat exchanger 4 in the supercooling heat exchanger 5. When the refrigerant exiting the outdoor heat exchanger 4 exits the supercooling heat exchanger 5, the refrigerant becomes a high-pressure refrigerant with further reduced temperature. The low-pressure refrigerant exiting the supercooling heat exchanger 5 reaches the piping that connects the accumulator 16 and the four-way valve 3.

Accordingly, since the enthalpy difference increases in a case where the capacity is the same, the required refrigerant flow rate can be reduced, thereby advantageously improving the performance due to reduction of pressure drop. Moreover, the amount of refrigerating machine oil in the path extending out from the outdoor unit and then returning to the outdoor unit via the indoor units can be reduced, thereby advantageously increasing the reliability of the compressor.

The terms "high pressure" and "low pressure" used here express a relative relationship of the pressures in the refrigerant circuit (the same applies to the temperatures).

Meanwhile, the high-pressure refrigerant exiting the supercooling heat exchanger 5 travels through the outdoor expansion mechanism 6; however, since the outdoor expansion mechanism 6 is fully open, the high-pressure refrigerant is not significantly depressurized and is supplied as a high-pressure low-temperature refrigerant to the liquid piping 7. Subsequently, the refrigerant is branched at the junction point 8 of the main liquid piping 7. The branched refrigerant respectively enters the indoor units 10p and 10q via the branch liquid pipings 9p and 9q and are depressurized by the indoor expansion mechanisms 11p and 11q, thereby becoming a low-pressure low-quality two-phase refrigerant. Then, the refrigerant is evaporated and gasified by the indoor heat exchangers 12p and 12q and travels through the branch gas pipings 13p and 13q, the junction point 14 of the main gas pipe, the main gas piping 15, the four-way valve 3, and the accumulator 16 so as to be sucked into the compressor 2.

When the two-phase refrigerant flows into the accumulator 16, the liquid refrigerant accumulates at the bottom thereof, whereas the gas-rich refrigerant flowing therein through an upper opening of the U-tube 16a is sucked into the compressor 2. Since liquid flowback to the compressor 2 can be temporarily prevented until transient liquid or two-phase refrigerant accumulated in the accumulator 16 overflows therefrom, the reliability of the compressor can be advantageously increased.

Although taking a long period of time, the refrigerating machine oil that could not be separated at the oil separator 17 circulates through the refrigerant circuit so as to be accumulated in the accumulator 16.

The refrigerating machine oil may behave in three different ways depending on the state in the accumulator 16. The first behavior is when there is no liquid refrigerant. In this case, when a certain amount of refrigerating machine oil is accumulated, the refrigerating machine oil is returned to the compressor 2 via the oil return hole 16b of the U-tube located at the lowermost position from the upper opening of the U-tube 16a. The second behavior is when there is liquid refrigerant in the accumulator 16 and the refrigeration-oil density is greater than the liquid-refrigerant density. In this case, since the refrigerating machine oil accumulates below the liquid refrigerant without dissolving into the refrigerant in the accumulator 16, the refrigerating machine oil behaves in the same manner as in the first behavior. The third behavior is when there is liquid refrigerant in the accumulator 16 and the refrigeration-oil density is smaller than the liquid-refrigerant density. In this case, the refrigerating machine oil accumulates above the liquid refrigerant without dissolving into the refrigerant in the accumulator 16. The refrigerating machine oil in this case is returned to the compressor 2 via the oil return hole or holes 16b, 16c, 16d, depending on the liquid level in the accumulator 16.

In any of the above three cases, by supplying the refrigerating machine oil to the compressor 2, the amount of oil accumulated in the accumulator 16 can be reduced, thereby advantageously increasing the reliability of the compressor and achieving lower cost due to reduction of an enclosed amount of refrigerating machine oil. However, when the liquid refrigerant accumulated at the bottom of the accumulator 16 or dissolved into the refrigerating machine oil is sucked into the compressor 2 via the oil return holes 16b, 16c, and 16d and when the liquid refrigerant is excessively sucked into the compressor, the reliability of the compressor may be reduced due to a failure of the compressor. As a measure of the above, the U-tube and the oil return holes are given appropriate shapes so that the refrigerant has appropriate quality for the compressor, and the accumulator can have a function such that only the refrigerating machine oil is returned to the compressor.

Figure 2:
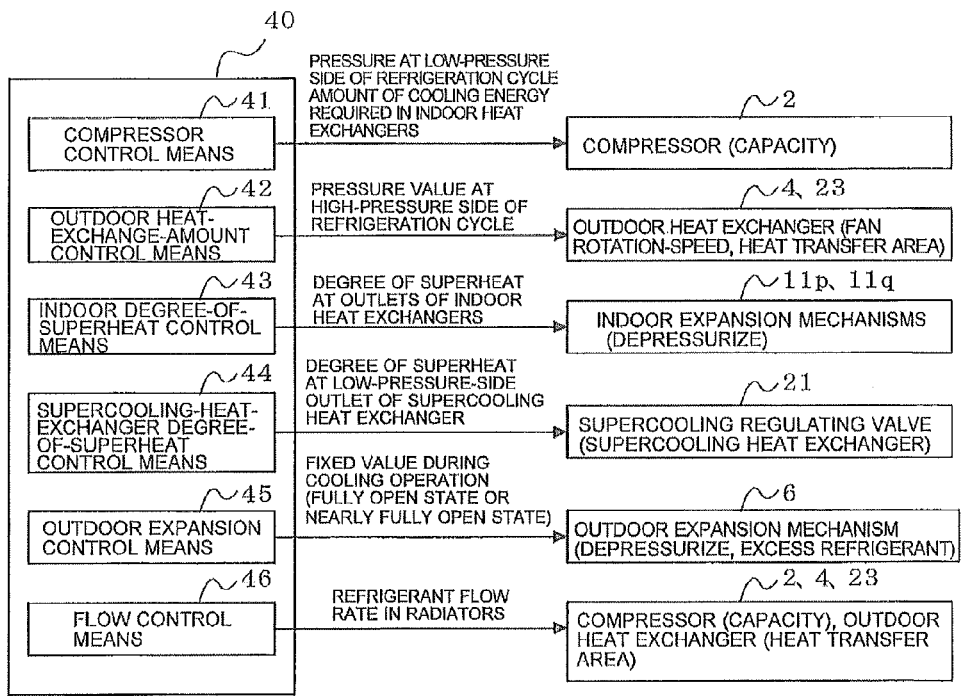
FIG. 2 illustrates a configuration and function of a controller 40 during a cooling operation.

Next, the control operation performed by the controller 40 in the air-conditioning apparatus will be described. FIG. 2 illustrates the configuration and operation of the controller 40 during the cooling operation. During the cooling operation, since the indoor heat exchangers 12$p$ and 12$q$ function as evaporators, an evaporating temperature (two-phase refrigerant temperature in the evaporators) is set so that a predetermined heat exchange capacity is exhibited, and a low-pressure value that achieves this evaporating temperature is set as a target low-pressure value. In compressor control means 41, rotation-speed control (operating capacity control) of the compressor 2 is performed with an inverter. The operation capacity of the compressor 2 is controlled such that a low-pressure value measured by the pressure sensor 32$b$ is made to become a set target value, for example, a pressure value corresponding to a saturation temperature of 10 degrees C. At the same time, although the rotation-speed control also causes the condensing temperature ("pseudo" saturation temperature based on the pressure of a radiator) to change, a certain range is set for a "pseudo" condensing temperature for ensuring performance and reliability, and a pressure value that achieves this "pseudo" condensing temperature is set as a target high-pressure value. The flow rate of a pump and the rotation speed of a fan for conveying water and air serving as media for transferring heat are controlled by the compressor control means 41 and outdoor heat-exchange-amount control means 42 on the basis of a state preset based on the heat exchange amount in the outdoor heat exchanger 4 and the heat exchange amounts in the indoor heat exchangers 12$p$ and 12$q$, so that pressure values measured by the pressure sensors 31$a$ and 31$b$ are within a target range. The heat transfer area of the outdoor heat exchanger 4 is adjusted by an opening/closing control of heat-exchange on-off valves 23 (23$a$, 23$b$, and 23$c$) and by utilizing the paths 4$a$, 4$b$, and 4$c$.

Furthermore, the opening degrees of the indoor expansion mechanisms 11$p$ and 11$q$ are controlled by indoor degree-of-superheat control means 43 such that degrees of superheat at the outlets of the indoor heat exchangers 12$p$ and 12$q$ calculated from (temperature of temperature sensor 32$h$)−(temperature of temperature sensor 32$f$) and (temperature of temperature sensor 32$i$)−(temperature of temperature sensor 32$g$), respectively, are made to become a target value. For this target value, a predetermined target value of, for example, 2 degrees C. is used. By controlling the degree of superheat at each outlet to its target, a proportion by which the two-phase refrigerant occupies the evaporators can be maintained in a preferred state.

Further, the outdoor expansion mechanism 6 is controlled to an initial opening degree preset by outdoor expansion control means 45, for example, to a fully opened or a nearly fully opened opening degree. The opening degree of the supercooling regulating valve 21 is controlled by supercooling-heat-exchanger degree-of-superheat control means 44 such that the degree of superheat at the outlet of the low-pressure-side of the supercooling heat exchanger 5 calculated from (temperature of temperature sensor 32$j$)−(saturation temperature converted from pressure measured by pressure sensor 31$b$) becomes a target value. For this target value, for example, 2 degrees C. is used so that heat exchange matching the specifications of the supercooling heat exchanger 5 is achieved.

Furthermore, flow control means 46 controls the capacity of the compressor 2 and the amount of heat exchange of the outdoor heat exchanger 4 so as to adjust the flow rate (or flow velocity) of the refrigerant in the radiator.

The compressor control means 41, the outdoor heat-exchange-amount control means 42, the supercooling-heat-exchanger degree-of-superheat control means 44, the outdoor expansion control means 45, and the flow control means 46 are included in the controller 40$a$ provided in the outdoor unit 1; and the indoor degree-of-superheat control means 43 is included in the controllers 40$p$ and 40$q$ provided in the indoor units 10$p$ and 10$q$.

Next, the operation during a heating operation will be described. The four-way valve 3 is connected in a direction indicated by dashed lines in FIG. 1. The opening degree of the outdoor expansion mechanism 6 is set in advance so that an appropriate pressure difference is generated before and after the outdoor expansion mechanism 6. The supercooling regulating valve 21 is totally closed, and the indoor expansion mechanisms 11$p$ and 11$q$ are set to appropriate opening degrees.

The flow of the refrigerant in this case is as follows. High-pressure high-temperature gas refrigerant discharged from the compressor 2 travels through the oil separator 17 and the four-way valve 3 so as to flow into the main gas piping 15. The oil separator 17 operates in the same manner as in the cooling operation. The refrigerant supplied to the indoor units 10$p$ and 10$q$ via the main gas piping 15 turns into a high-pressure low-temperature refrigerant by radiating heat at the indoor heat exchangers 12$p$ and 12$q$ in the indoor units 10$p$ and 10$q$ and is depressurized by indoor expansion mechanisms 11$p$ and 11$q$ so as to turn into an intermediate-pressure liquid-phase refrigerant or a two-phase refrigerant nearly in a saturated liquid state. The intermediate-pressure refrigerant travels through the main liquid piping 7 and subsequently flows into the outdoor unit 1 where the refrigerant turns into a low-pressure two-phase state by traveling through the outdoor expansion mechanism 6. The low-pressure two-phase refrigerant travels through the supercooling heat exchanger 5 and then is evaporated in the outdoor heat exchanger 4 so as to become a low-pressure low-temperature refrigerant. Then, the low-pressure low-temperature refrigerant travels through the accumulator 16 and is sucked into the compressor 2. The accumulator 16 operates in the same manner as in the cooling operation described above. Since the supercooling regulating valve 21 is totally closed and does not have any flow therein, there is no heat exchange in the supercooling heat exchanger 5. If there is a flow in the supercooling regulating valve 21, heat exchange would be performed, causing the performance to deteriorate in proportion.

Figure 3:
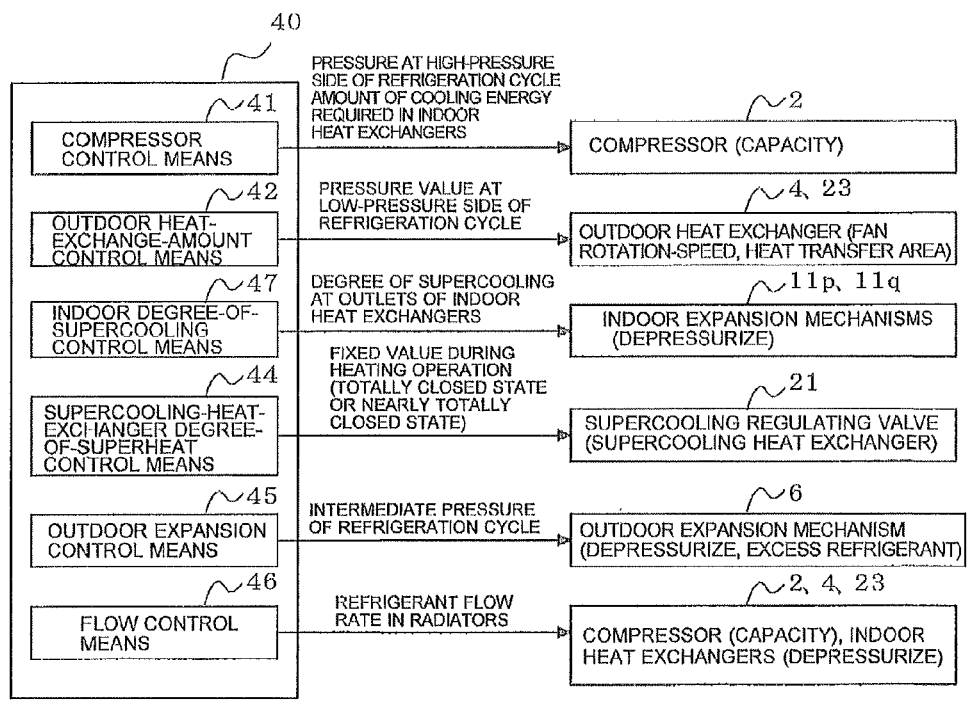
FIG. 3 illustrates the configuration and function of the controller 40 during a heating operation.

FIG. 3 illustrates the configuration and operation of the controller 40 during the heating operation. During the heating operation, since the indoor heat exchangers 12$p$ and 12$q$ function as radiators, a "pseudo" condensing temperature is set so that a predetermined heat exchange amount is exhibited, and a high-pressure value that achieves this "pseudo" condensing temperature is set as a target high-pressure value. Then, in the compressor control means 41 performs rotation-speed control of the compressor 2 with the inverter. The operation capacity of the compressor 2 is controlled such that a high-pressure value measured by the pressure sensor 31$a$ becomes a preset target value, for example, a pressure value corresponding to a "pseudo" saturation temperature of 50 degrees C. At the same time, although the rotation-speed control also causes the evaporating temperature in the outdoor heat exchanger 4 to change, a certain range is set for ensuring performance and reliability, and a low-pressure value that achieves this evaporating temperature is set as a target low-pressure value. The flow rate of the pump and the rotation speed of the fan for transporting water and air serving as heat transfer media are controlled by the compressor control means 41 and the outdoor heat-exchange-amount control means 42 on the basis of a state preset based on the heat exchange amount in the outdoor heat exchanger 4 and the heat exchange amounts in the indoor heat exchangers 12$p$ and 12$q$, so that a low-pressure value measured by the pressure sensor 31b is within a target range. In compressor control means 41, rotation-speed control (operating capacity control) of the compressor 2 is performed with an inverter.

Furthermore, the opening degrees of the indoor expansion mechanisms 11p and 11q are controlled by indoor degree-of-supercooling control means 47 such that degrees of supercooling at the outlets of the indoor heat exchangers 12p and 12q calculated respectively from ("pseudo" saturation temperature converted from pressure measured by pressure sensor 31a)–(temperature of temperature sensor 32f) and ("pseudo" saturation temperature converted from pressure measured by pressure sensor 31a)–(temperature of temperature sensor 32g) are made to become a target value (temperature). For this target value, a predetermined target value of, for example, 10 degrees C. is used. The supercooling regulating valve 21 is controlled so as to be fixed to an initial opening degree preset by the supercooling-heat-exchanger degree-of-superheat control means 44, for example, to a totally closed or a nearly totally closed opening degree.

The opening degree of the outdoor expansion mechanism 6 is controlled by the outdoor expansion control means 45 such that the pressure measured by the pressure sensor 31c becomes (a pressure value that achieves "pseudo" condensing saturation temperature) and (a pressure corresponding to when an enthalpy determined from ("pseudo" saturation temperature)–(target value of degrees of supercooling at outlets of indoor heat exchangers) matches a saturation enthalpy of $CO_2$).

Furthermore, the flow control means 46 controls the capacity of the compressor 2 and the indoor expansion mechanisms 11p and 11q so as to adjust the flow rate (or flow velocity) of the refrigerant in the radiators.

The compressor control means 41, the outdoor heat-exchange-amount control means 42, the supercooling-heat-exchanger degree-of-superheat control means 44, the outdoor expansion control means 45, and the flow control means 46 are included in the controller 40a provided in the outdoor unit 1, and the indoor degree-of-supercooling control means 47 is included in the controllers 40p and 40q provided in the indoor units 10p and 10q.

With regard to the difference between the heating operation and the cooling operation, during the cooling operation, a high-pressure liquid refrigerant exists in the main liquid piping 7 and the liquid branch pipings 9p and 9q, whereas during the heating operation, an intermediate-pressure liquid-phase refrigerant or two-phase refrigerant nearly in a saturated liquid state exists in the main liquid piping 7 and the liquid branch pipings 9p and 9q. Therefore, in the heating operation, excess refrigerant is generated since the refrigerant cannot be sufficiently retained in the main liquid piping 7 and the liquid branch pipings 9p and 9q, as compared with the cooling operation, and this excess refrigerant exists as a liquid refrigerant in the accumulator 16. In a large-capacity air-conditioning apparatus, the piping diameters and piping lengths of the main liquid piping 7 and the liquid branch pipings 9p and 9q are increased, resulting in a further increase in the excess refrigerant.

However, if the outdoor expansion mechanism 6 is not provided, the refrigerant in the main liquid piping 7 and the liquid branch pipings 9p and 9q would be in a low-pressure, two-phase state, resulting in an increase in the amount of excess refrigerant. Because the density of the refrigerant in the main liquid piping 7 and the liquid branch pipings 9p and 9q is large, the amount of excess refrigerant is suppressed by adjusting the opening degree of the outdoor expansion mechanism 6. Furthermore, by appropriately adjusting the opening degree of the outdoor expansion mechanism 6 during the cooling operation, the liquid refrigerant in the main liquid piping 7 and the liquid branch pipings 9p and 9q during the cooling operation is reduced, whereby the amount of excess refrigerant during the heating operation can be suppressed.

Generally, the outdoor heat exchanger 4 has a larger capacity than that of the indoor heat exchangers 12p and 12q, and the capacity difference occurring when the heat exchangers are used as radiators creates an excess refrigerant during the heating operation. A value obtained by multiplying a safety factor to the sum of the amount of excess refrigerant in the heat exchangers and the amount of excess refrigerant in the main liquid piping 7 and the liquid branch pipings 9p and 9q is equal to the accumulator capacity. In the air-conditioning apparatus, a large accumulator would affect the cost and compactness.

The supercooling heat exchanger 5 is used during the cooling operation but is not used during the heating operation. This is intended to reduce a pressure loss in the low-pressure-side circuit during the cooling operation. With $CO_2$, which has a large heat conveying capacity, pressure loss is small, unlike fluorocarbon refrigerants. Therefore, it appears that it is not necessary to provide the supercooling heat exchanger 5. However, if the apparatus is designed focusing mainly on the heat radiating performance of the indoor heat exchangers 12p and 12q so as to improve the heat transfer performance during the heating operation, the number of paths would be reduced, which may cause pressure loss during the cooling operation to become larger than that when a fluorocarbon refrigerant is used. Therefore, the supercooling heat exchanger 5 is effective for achieving both cooling and heating performance.

As above, the operation during the cooling operation and the operation during the heating operation have been described. Note that the above description relates to a case where the indoor load is a rated load that is equivalent to the rated capacity of the air-conditioning apparatus. A case in which the indoor load is a partial load that is smaller than the rated capacity of the air-conditioning apparatus will be described below.

First, the partial load during the cooling operation will be described. If the indoor load is small, the number of operating indoor units will decrease correspondingly and there will be a suspended indoor unit. When the indoor unit 10p stops, the opening degree of the indoor expansion mechanism 11p becomes zero, in which the amount of refrigerant circulating therein becomes zero. Because the indoor heat exchanger 12p is in a low-pressure gaseous state, no refrigerant will stagnate during the suspension. Since the amount of circulating refrigerant is zero, the refrigerating machine oil flowing together with the refrigerant does not accumulate, so that the reliability of the compressor is ensured.

The frequency of the compressor decreases in order to maintain the evaporating temperature at a fixed temperature in accordance with the suspension of one or some of the indoor units. Since the amount of heat exchange in the indoor unit and the input of the compressor decrease, (outdoor heat-exchange amount)=(indoor heat-exchange amount)+(compressor input) is satisfied, so that the amount of heat exchange in the outdoor unit decreases.

Figure 4:
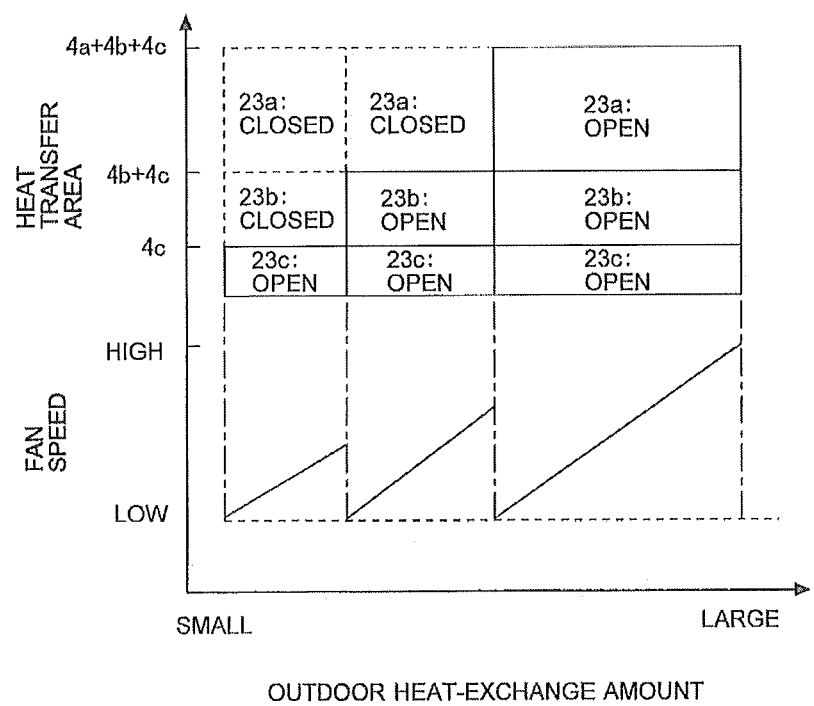
FIG. 4 illustrates relationships of an outdoor heat-exchange amount, an air velocity of a fan, and a heat transfer area.

FIG. 4 illustrates the relationships between the outdoor heat-exchange amount, the air velocity of the fan, and the heat transfer area. First, the air velocity of the fan is reduced so as to reduce the outdoor heat-exchange amount. When the air velocity of the fan reaches a certain lower limit value, the heat transfer area is reduced to further reduce the outdoor heat-exchange amount. If all of the heat-exchange on-off valves 23a, 23b, and 23c are open, the heat-exchange on-off valve 23a is first closed, and the air velocity of the fan is increased. In this case, the air velocity of the fan is lower than the maximum air velocity corresponding to when all of the heat-exchange on-off valves are open. This is for continuously changing the outdoor heat-exchange amount when the heat-exchange on-off valve is switched. If the outdoor heat-exchange amount is to be further reduced, the air velocity of the fan is reduced. When the air velocity of the fan reaches a certain lower limit value, the heat transfer area is reduced to further reduce the outdoor heat-exchange amount. The heat-exchange on-off valve 23b is closed, and the air velocity of the fan is increased.

Next, the partial load during the heating operation will be described. If the indoor load is small, the number of operating indoor units will decrease correspondingly and there will be a suspended indoor unit. When the indoor unit 10p stops, the opening degree of the indoor expansion mechanism 11p is slightly open, so that there is a small amount of refrigerant circulating therein. This is to suppress loss of control stability, which is the result of decrease in the amount of required refrigerant caused by uneven refrigerant distribution in the refrigeration cycle. Specifically, such uneven refrigerant distribution may occur when the indoor expansion mechanism 11p is totally closed and the refrigerant in the indoor heat exchanger 10p being eventually cooled turns into a low-temperature high-density refrigerant; hence increasing the amount of refrigerant in the suspended indoor unit.

However, since there is only a small amount of circulating refrigerant, the refrigerating machine oil tends to accumulate easily. On the other hand, if the circulating amount of the refrigerant is increased, it will not be suspending the indoor unit in accordance with the load; hence the flow rate of the refrigerant is set to a small value, as well as to control the load. With regard to the accumulation of the refrigerating machine oil, oil-return operation, to be described later, is performed to ensure the reliability of the compressor.

The frequency of the compressor decreases in order to maintain the "pseudo" condensing temperature at a fixed temperature in accordance with the suspension of the indoor unit. Since the amount of heat exchange in the indoor unit and the input of the compressor decrease, (outdoor heat-exchange amount)=(indoor heat-exchange amount)+(compressor input) is satisfied, so that the amount of heat exchange in the outdoor unit decreases. The operation of the controllers during this decrease is the same as that in the cooling operation.

By performing control in the above-described manner, the air-conditioning apparatus can respond to changes in the indoor load during both the cooling operation and the heating operation.

Figure 5A:
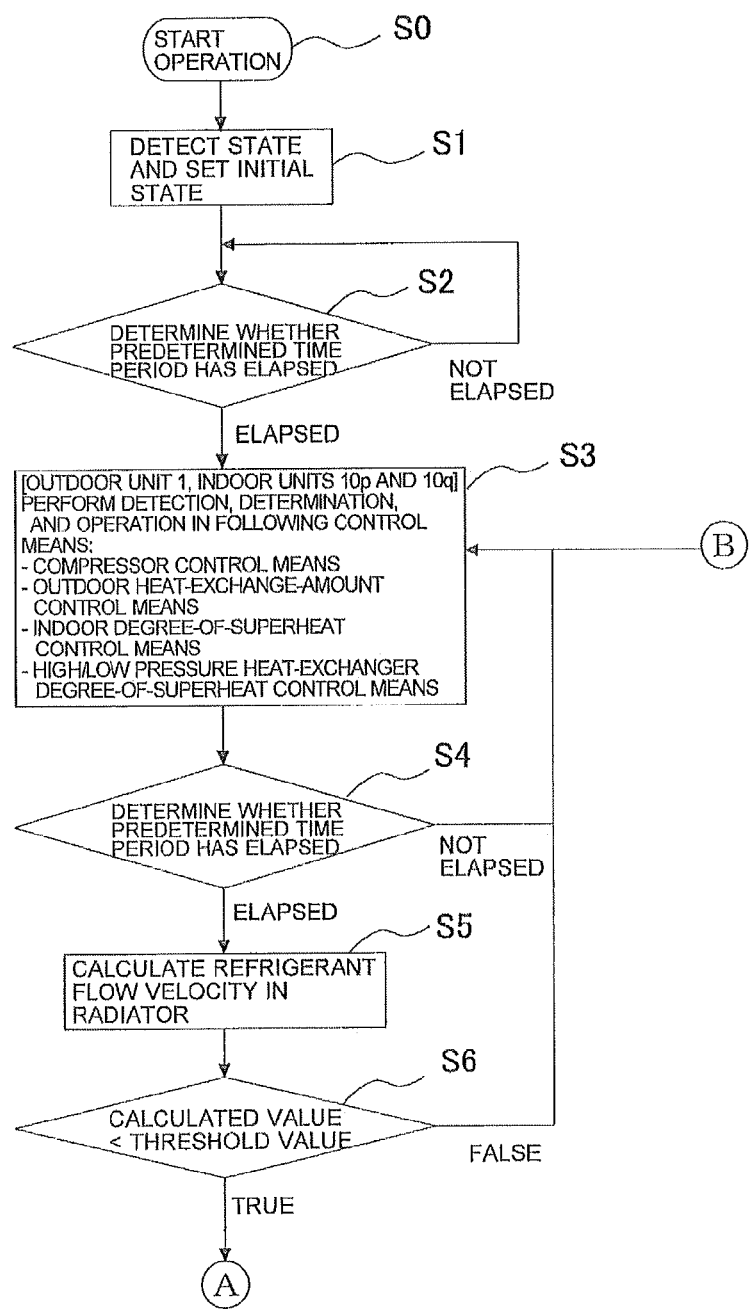
FIG. 5A is a flowchart illustrating control performed by the controller during the cooling operation.
Figure 5B:
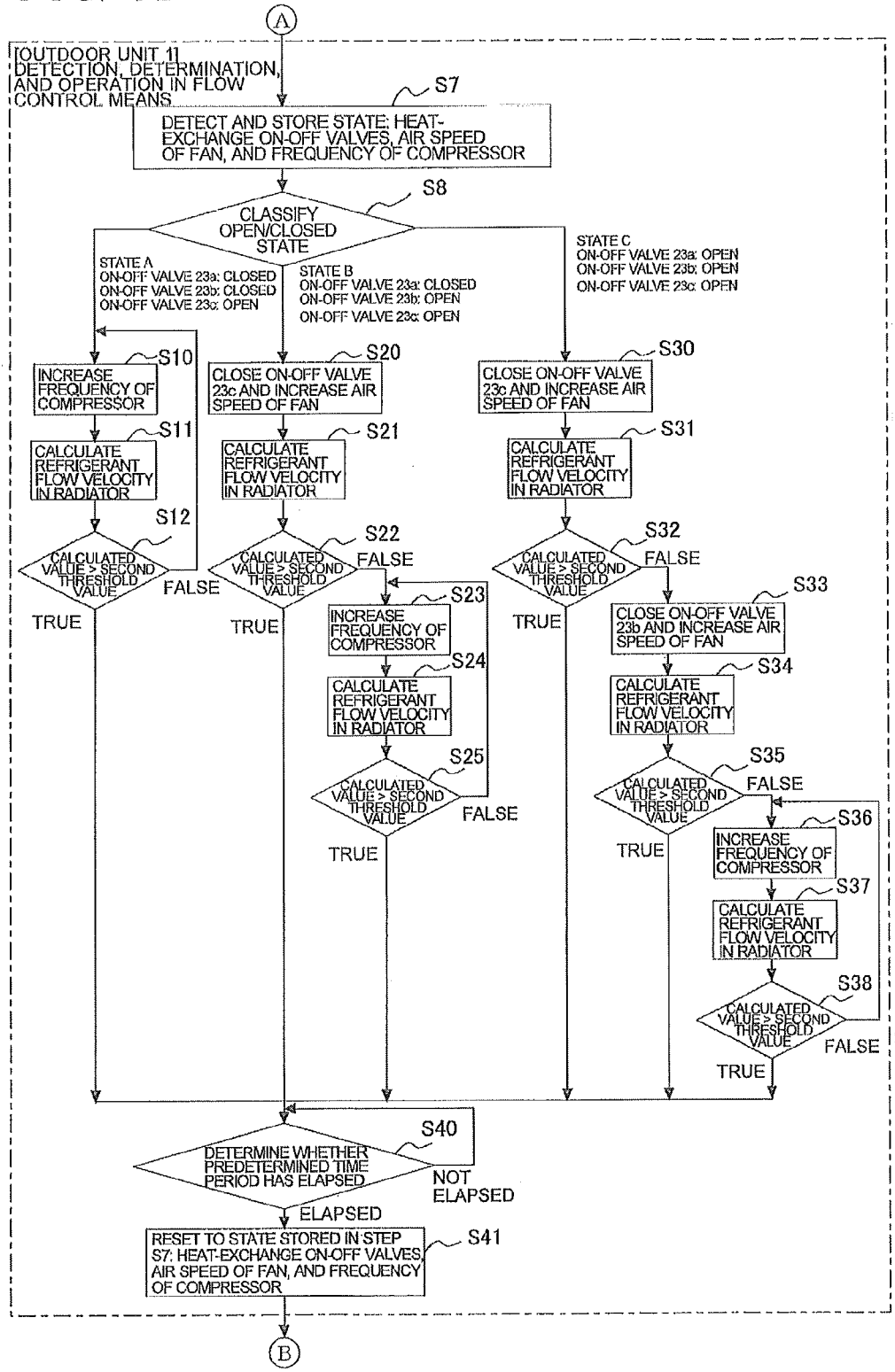
FIG. 5B is a flowchart continued from FIG. 5A.

Next, the refrigerating machine oil that circulates together with the refrigerant in the refrigeration cycle will be described. First, description will be given in a case in which the cooling operation is performed. In the case of a rated load, the amount of circulating refrigerant is generally large so that the refrigerating machine oil is less likely to accumulate. However, due to having immiscible properties, the refrigerant oil tends to accumulate easily in the cycle when the refrigerant is a high-pressure low-temperature since the flow velocity of the refrigerant is low. This is especially noticeable in the case of a partial load, and, accordingly, the flow velocity of the refrigerant needs to be set to a certain value or higher. FIGS. 5A and 5B are flowcharts illustrating an explanatory control performed by the controller 40 during the cooling operation. The control process will be described below.

First, in step S0, the compressor 2 and the like are activated so that the air-conditioning apparatus starts the cooling operation. In step S1, the multiple control means constituting the controller 40 set fixed values based on initial settings according to initial-state detection results of the respective sensors.

In step S2, it is determined whether a predetermined time period (e.g., 5 minutes or 10 minutes) has elapsed since the air-conditioning apparatus has started operating.

If it is determined in step S2 that the predetermined time period has elapsed since the start of operation, the process proceeds to step S3 where the control means (40, 41, 42, 43, 44, and 45) excluding the flow control means 46 control their respective control targets on the basis of information (data) related to the pressure sensors 31 (31a, etc.), the temperature sensors 32 (32a, etc.), and status of use (load conditions) of the indoor units 10p and 10q. Then, in step S4, it is determined whether a predetermined time period (e.g., 5 minutes or 10 minutes) has elapsed. In this case, in contrast to the aforementioned control means performing the determination every time (e.g., every 1 minute) specific control commands are output thereto, the determination in the flow control means 46 is performed such that the flow control means 46 performs step S4 at a sufficiently longer time interval (e.g., every 5 minutes). This is to prevent the occurrence of, for example, hunting so as to allow stable control.

When the predetermined time period has elapsed in step S4, the refrigerant flow velocity at the outlet side of the outdoor heat exchanger 4 serving as a radiator is calculated in step S5. This calculation can be performed in the following manner. The compressor control means 41 and the outdoor heat-exchange-amount control means 42 have a target high-pressure value and a target low-pressure value, and the amount of circulating refrigerant is calculated from the target low-pressure value, a detection value of the temperature sensor 32b, and the frequency of the compressor. Then, the density at the outlet of the radiator is calculated from the target high-pressure value and a detection value of the temperature sensor 32d. Furthermore, a mean refrigerant flow velocity at the outlet side of the outdoor heat exchanger 4 can be calculated on the basis of the open/closed state of the heat-exchange on-off valves 23a, 23b, and 23c, the number of radiator paths pre-stored in the controller 40, and the cross-sectional area of heat transfer pipings in the radiator.

In step S6, if the calculated value is larger than or equal to a predetermined threshold value, since no oil would accumulate, the process returns to step S3. However, if the apparatus operates in a partial-load operation due to environmental conditions, such as a load-side request or the outdoor air temperature, the refrigerant flow velocity decreases, causing the calculated value to become smaller than the threshold value. In that case, the process proceeds to step S7.

In step S7, the current open/closed state of the heat-exchange on-off valves 23a, 23b, and 23c, the current air velocity of the fan in the outdoor heat exchanger 4, and the current frequency of the compressor 2 are stored. Then, the process proceeds to step S10 if the open/closed state corresponds to state A heat-exchange on-off valve 23a: closed, 23b: closed, 23c: opened). In this case, since there are no on-off valves to be closed, the frequency of the compressor 2 is increased so as to increase the flow velocity. Then, in step S11, the increased refrigerant flow velocity is calculated using the method described in step S5. In step S12, if the calculated value is greater than a predetermined second threshold value, the process proceeds to step S40. If the calculated value is smaller than or equal to the second threshold value in step S12, the process returns to step S10.

If the open/closed state corresponds to state B (heat-exchange on-off valve 23a: closed, 23b: opened, 23c: opened) in step S8, the process proceeds to step S20. In step S20, the on-off valve 23c is closed, and the air velocity of the fan is increased so as to compensate for an amount by which the heat transfer area of the outdoor heat exchanger 4 is reduced by the closed path 4c. In step S21, the refrigerant flow velocity is calculated using the method described in step S5. In step S22, if the calculated value is greater than the predetermined second threshold value, the process proceeds to step S40. If the calculated value is smaller than or equal to the second threshold value, the process proceeds to step S23. In step S23, the frequency of the compressor 2 is increased. In step S24, the refrigerant flow velocity is calculated. In step S25, if the calculated value is greater than the second threshold value, the process proceeds to step S40. If the calculated value is smaller than or equal to the second threshold value in step S25, the process returns to step S23.

If the open/closed state corresponds to state C (heat-exchange on-off valve 23a: open, 23b: open, 23c: open) in step S8, the process proceeds to step S30. When the heat-exchange on-off valve 23c is closed in step S30, since the heat transfer area of the outdoor heat exchanger 4 is reduced by an amount equivalent to the path 4c, the air velocity of the fan is increased so as to compensate for that amount. In step S31, the refrigerant flow velocity is calculated. In step S32, if the calculated value is greater than the predetermined second threshold value, the process proceeds to step S40. On the other hand, if the calculated value is smaller than or equal to the second threshold value, the on-off valve 23b is closed in step S33, and the air velocity of the fan is increased so as to compensate for an amount by which the heat transfer area of the outdoor heat exchanger 4 is reduced by the closed path 4b. Furthermore, in step S34, the refrigerant flow velocity is calculated. In step S35, if the calculated value is greater than the predetermined second threshold value, the process proceeds to step S40. If the calculated value is smaller than or equal to the second threshold value, the frequency of the compressor 2 is increased in step S36. In step S37, the refrigerant flow velocity is calculated. In step S38, if the calculated value is greater than the second threshold value, the process proceeds to step S40. If the calculated value is smaller than or equal to the second threshold value, the process returns to step S36.

When a predetermined time period elapses in step S40, the process proceeds to step S41. In step S41, the state is reset to the state stored in step S7, and the process returns to step S3.

By performing control by utilizing the refrigerant flow velocity at the outlet of the radiator in the above-described manner, the refrigerating machine oil can be prevented from accumulating while also maintaining stable control.

As a threshold value of the refrigerant flow velocity, an empirically set value has been used in the related art. However, there are no findings or design technique with regard to the flow patterns of oil in a supercritical state. In the related art, a threshold value of the refrigerant flow velocity has been set by using physical properties of gas refrigerants and physical properties of refrigerating machine oil in an air-water flooding velocity equation. However, since the density difference between a supercritical low-temperature refrigerant and refrigerating machine oil is small, when the properties are substituted into the flooding velocity equation, the calculation result indicated that oil accumulation does not occur.

However, a result obtained from a visualization experiment indicates that the amount of accumulated oil increases at a refrigerant flow velocity that is higher than or equal to a value (e.g., 0.2 m/s) obtained by substituting the refrigerating machine oil properties and the refrigerant properties into the flooding velocity equation, and that the flow patterns of oil changes at that time.

Figure 6:
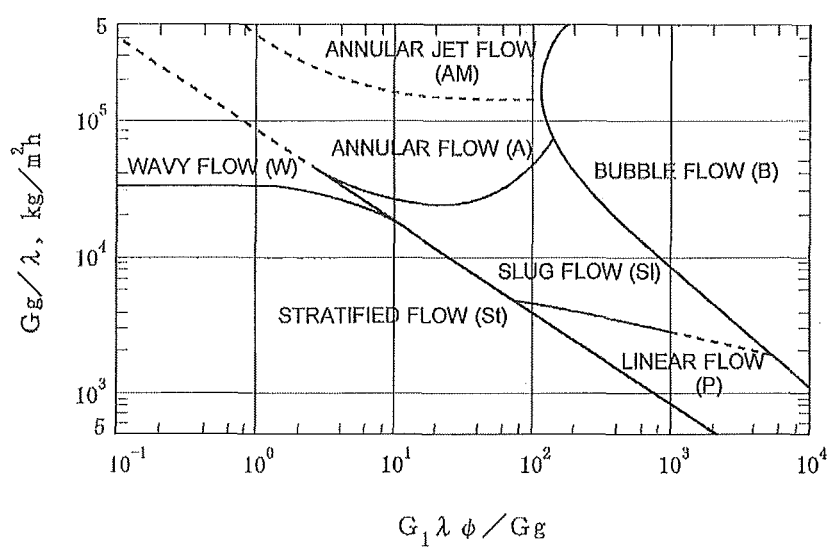
FIG. 6 is a Baker diagram illustrating flow patterns.

FIG. 6 is a Baker diagram illustrating flow patterns. It is known that the amount of accumulated oil increases when the flow pattern changes from an annular flow to a laminar flow (stratified flow in FIG. 6). Although the Baker diagram illustrates two-phase flow patterns in an air-water system, it is known that, when the refrigerant, which has low viscosity, and the refrigerating machine oil, which has high viscosity, are replaced with air and water, respectively, they behave in the same manner. The threshold value of the refrigerant flow velocity can be determined from the operating state of the air-conditioning apparatus in the aforementioned visualization experiment. In a representative use condition of a $CO_2$ refrigerant, the threshold value ranges between 0.4 m/s and 0.6 m/s. However, in view of exceptional cases, the threshold value of the flow velocity of $CO_2$ refrigerant in Embodiment 1 is set within a range between 0.3 m/s and 0.7 m/s.

The second threshold value is determined by returning the refrigerating machine oil accumulated within a specific time period, and is greater than the aforementioned threshold value. For example, the second threshold value is 1.5 times the aforementioned threshold value.

Figure 7A:
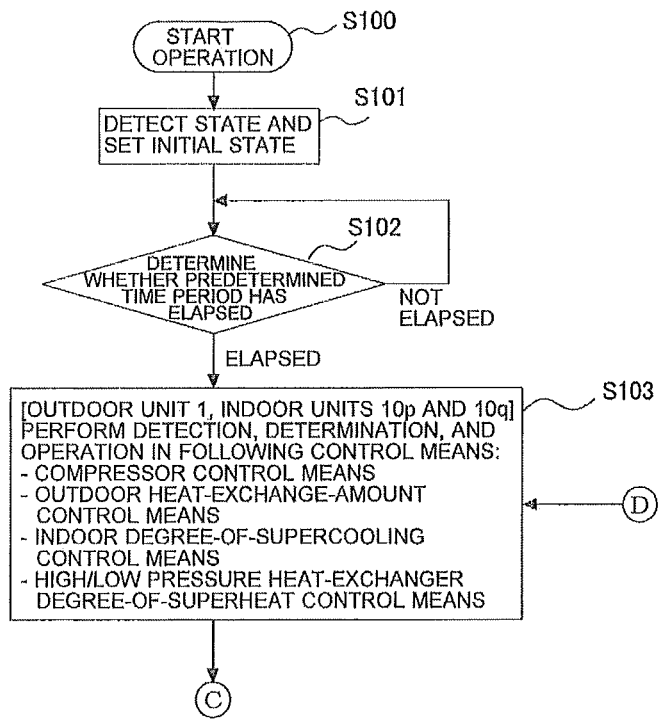
FIG. 7A is a flowchart illustrating control performed by the controller during the heating operation.
Figure 7B:
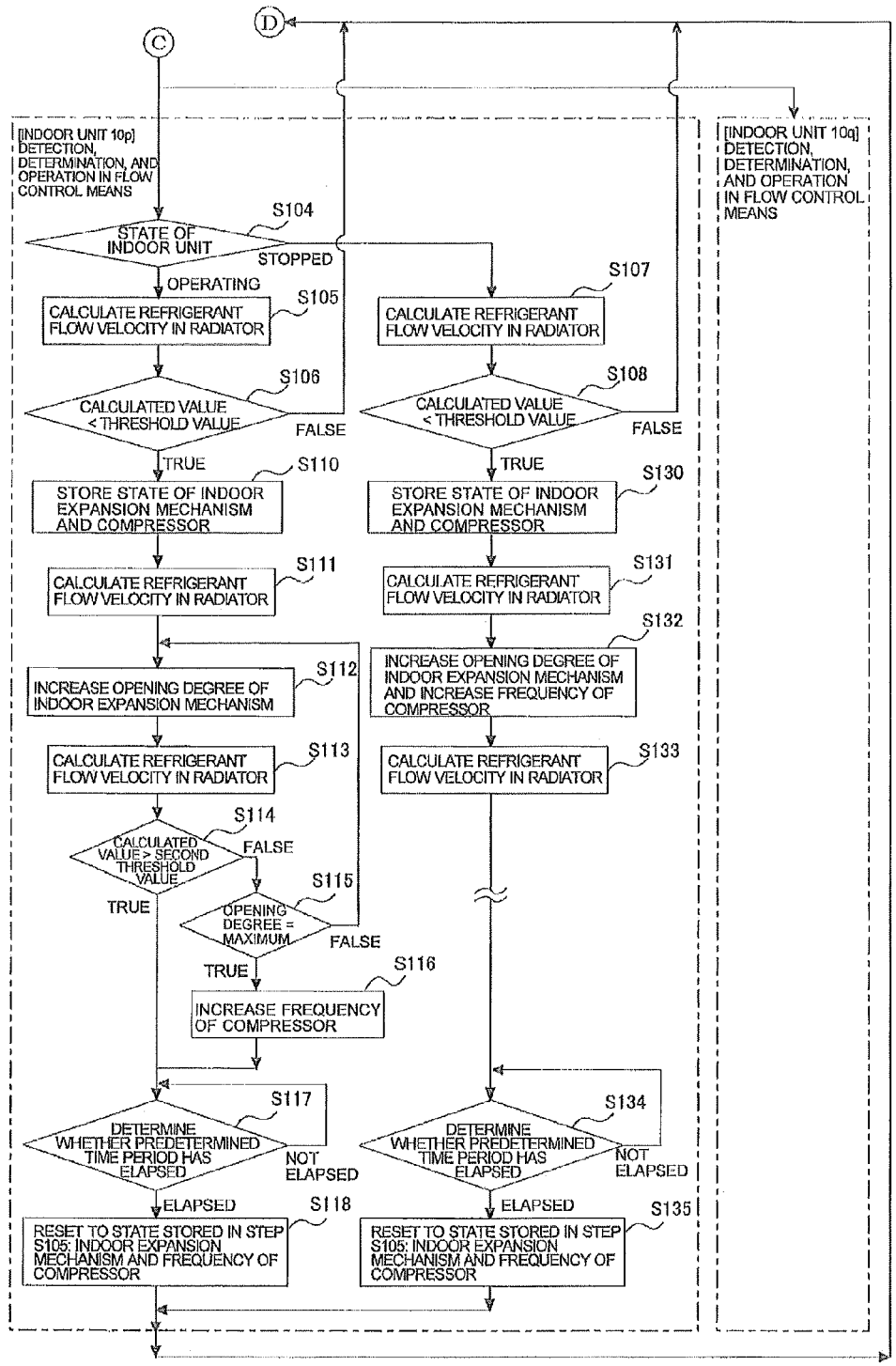
FIG. 7B is a flowchart continued from FIG. 7A.

FIGS. 7A and 7B are flowcharts illustrating an explanatory control performed by the controller 40 during the heating operation. In this case, unlike during the cooling operation, the indoor heat exchangers 12p and 12q function as radiators.

First, in step S100, the compressor 2 and the like are activated so that the air-conditioning apparatus starts the heating operation. In step S101, the multiple control means constituting the controller 40 set fixed values based on initial settings according to initial-state detection results of the respective sensors.

In step S102, it is determined whether a predetermined time period (e.g., 5 minutes or 10 minutes) has elapsed since the air-conditioning apparatus has started operating.

If it is determined in step S102 that the predetermined time period has elapsed since the start of operation, the process proceeds to step S103 where the control means (40, 41, 42, 47, 44, and 45) excluding the flow control means 46 control their respective control targets on the basis of information (data) related to the pressure sensors 31 (31a, etc.), the temperature sensors 32 (32a, etc.), and usage conditions (load conditions) of the indoor units 10p and 10q. Then, in step S104, the maneuvering state of each indoor unit is determined. This is performed since the behavior of the indoor heat exchanger is different between the operating state and the stopped state. In particular, if the indoor unit is stopped, the temperature sensors often make detection errors, and it is therefore necessary to change the calculation method.

When the indoor units are in operation, the refrigerant flow velocity is calculated in step S105 in the same manner as in the cooling operation. In step S106, since the refrigerating machine oil would not accumulate if the calculated value is larger than or equal to a predetermined threshold value, the process returns to step S103. If the calculated value is smaller than the threshold value in step S106, the frequency of the compressor 2 and the indoor expansion mechanisms 11p and 11q are stored in step S110.

Subsequently, in step S112, the opening degrees of the indoor expansion mechanisms 11p and 11q are increased so as to increase the amount of circulating refrigerant. Then, in step S113, the refrigerant flow velocity is calculated. In step S114, if the calculated value is greater than a predetermined second threshold value, the process proceeds to step S117. If the calculated value is smaller than or equal to the second threshold value, the opening degrees of the indoor expansion mechanisms are determined in step S115. If the opening degrees are not at their maximum, the process returns to step S112. If the opening degrees are at their maximum, the frequency of the compressor 2 is increased in step S116, and the process proceeds to step S117.

When a certain time period elapses in step S117, the process proceeds to step S118 where the state is reset to the state stored in step S110, and the process returns to step S103.

If an indoor unit is in a stopped state in step S104, the process is performed in a substantially similar manner to the above. However, a part of the flow is omitted in FIG. 7B. In this case, in step S132 corresponding to step S112, the frequency of the compressor 2 is increased in addition to increasing the indoor expansion mechanism 11p, 11q.

Furthermore, the indoor unit 10q is controlled in a similar manner as that of the indoor unit 10p.

Steps S111 and S131 in FIG. 7B may be omitted, and are not included in the above description.

Because the air-conditioning apparatus according to Embodiment 1 has the above-described configuration, a large amount of refrigerating machine oil is prevented from being accumulated in each radiator in any operating state, thereby appropriately ensuring the reliability of the apparatus.

Although the above description of Embodiment 1 relates to an air-conditioning apparatus based on a direct refrigerant cooling method, the invention may alternatively be applied to a type that performs air-conditioning indirectly by using a conveying medium, such as a chiller. Furthermore, although the above description relates to a cooling-heating switching method in which all of the indoor units are in either a cooling operation or a heating operation, similar advantages can be achieved in a simultaneous cooling-heating method if the heat exchangers are radiators. Furthermore, since the refrigeration cycle of carbon dioxide has low efficiency, power recovery may be performed at an expansion mechanism so as to allow for improved performance.

Furthermore, although a mean refrigerant flow velocity is calculated as a calculation value in Embodiment 1, if a worst refrigerant flow velocity corresponding to one with a poor path balance in a radiator is ascertained in advance, the refrigerant flow velocity for the corresponding path may be calculated. This allows improved reliability since determination is performed on the basis of a path in which the oil is accumulated.

REFERENCE SIGNS LIST 1 outdoor unit; 2 compressor; 3 four-way valve; 4 outdoor heat exchanger; 4a, 4b, 4c outdoor-heat-exchanger paths; 5 supercooling heat exchanger; 6 outdoor expansion mechanism; 7 main liquid piping; 8 junction point of main liquid piping; 9p, 9q liquid branch pipings; 10p, 10q indoor units; 11p, 11q indoor expansion mechanisms; 12p, 12q indoor heat exchangers; 13p, 13q gas branch pipings; 14 junction point of main gas piping; 15 main gas piping; 16 accumulator; 16a U-tube; 16a, 16b, 16c oil return holes; 17 oil separator; 18 oil return bypass; 19 capillary tube; 21 supercooling regulating valve; 22 supercooling bypass; 23 (23a, 23b, 23c) heat-exchange on-off valves; 31 (31a, 31b, 31c) pressure sensors; 32 (32a to 32k) temperature sensors; 40 (40a, 40p, 40q) controllers; 41 compressor control means; 42 outdoor heat-exchange-amount control means; 43 indoor degree-of-superheat control means; 44 supercooling-heat-exchanger degree-of-superheat control means; 45 outdoor expansion control means; 46 flow control means; 47 indoor degree-of-supercooling control means.

The invention claimed is:

1. An air-conditioning apparatus that uses a refrigerant, which operates in a transcritical cycle, and refrigerating machine oil, which has low miscibility with the refrigerant, in a refrigerant circuit for a refrigeration cycle connected to a compressor, a radiator, an expansion mechanism, and an evaporator, the air-conditioning apparatus comprising:
   a flow regulating mechanism provided in the refrigerant circuit; and
   a controller that controls the flow regulating mechanism, wherein
   the controller is configured to, if a refrigerant flow velocity at an outlet side of the radiator is lower than a predetermined threshold value, increase the refrigerant flow velocity, in which the refrigerant is in a supercritical state, at the outlet side of the radiator, by the flowing regulating mechanism so that an oil-return operation that returns the refrigerating machine oil discharged from the compressor to the compressor is performed until the refrigerant flow velocity is greater than a second threshold value which is larger than the predetermined threshold value and a predetermined time period elapses, and
   the predetermined threshold value is a flow velocity of the refrigerant within a transitional phase in which the refrigerant and the refrigerating machine oil change from an annular flow to a laminar flow.

2. The air-conditioning apparatus of claim 1, wherein the predetermined threshold value is determined on the basis of a boundary between a laminar flow and an annular flow.

3. The air-conditioning apparatus of claim 1, wherein the radiator is one of a plurality of radiators, the refrigerant flow velocity in each radiator is checked, and then the oil-return operation corresponding to the radiator is performed individually.

4. The air-conditioning apparatus of claim 1, wherein each radiator includes a plurality of paths and the refrigerant flow velocity is set to be either one or a mean value of refrigerant flow velocities of the respective paths.

5. The air-conditioning apparatus of claim 1, wherein the expansion mechanism has a function of the flow regulating mechanism and the controller changes an opening degree of the expansion mechanism.

6. The air-conditioning apparatus of claim 1, wherein
   each radiator includes a plurality of paths; the refrigerant flow velocity, which is a key value for the oil-return operation, is set to be either one or a mean value of refrigerant flow velocities of the respective paths; a plurality of on-off valves are provided at inlets of the radiators, respectively; the expansion mechanism has a function of the flow regulating mechanism; multiple passages extend from an outlet of the compressor to an inlet of the evaporator; and if a certain refrigerant flow velocity in outlet sides of the radiators is lower than a certain threshold value, the on-off valves corresponding to other several radiators with refrigerant flow velocities higher than or equal to the threshold value are closed.

7. The air-conditioning apparatus of claim 1, wherein the compressor is capable of controlling a capacity by changing a frequency thereof and the controller changes the frequency of the compressor.

8. The air-conditioning apparatus of claim 1, wherein the refrigerant is carbon dioxide.

9. The air-conditioning apparatus of claim 8, wherein the threshold value ranges between 0.3 m/s and 0.7 m/s.

10. An air-conditioning apparatus that uses a refrigerant, which operates in a transcritical cycle, and refrigerating machine oil, which has low miscibility with the refrigerant, in a refrigerant circuit for a refrigeration cycle connected to a compressor, a radiator, an expansion mechanism, and an evaporator, the air-conditioning apparatus comprising:
- a flow regulating mechanism provided in the refrigerant circuit; and
- a controller that controls the flow regulating mechanism, wherein
- the controller is configured to, if a refrigerant flow velocity at an outlet side of the radiator is lower than a predetermined threshold value, increase the refrigerant flow velocity, in which the refrigerant is in a supercritical state, at the outlet side of the radiator, by reducing a heat transfer area by the flow regulating mechanism so that an oil-return operation that returns the refrigerating machine oil discharged from the compressor to the compressor is performed for at least a predetermined time period, and
- the predetermined threshold value is a flow velocity of the refrigerant within a transitional phase in which the refrigerant and the refrigerating machine oil change from an annular flow to a laminar flow.

* * * * *